(12) United States Patent
Kimball et al.

(10) Patent No.: US 7,663,342 B2
(45) Date of Patent: Feb. 16, 2010

(54) APPARATUS, SYSTEM, AND METHOD FOR CONTROLLING MULTIPLE POWER SUPPLIES

(75) Inventors: Jonathan W. Kimball, Mahomet, IL (US); Philip T. Krein, Champaign, IL (US); Nicholas D. Benavides, Champaign, IL (US)

(73) Assignee: SolarBridge Technologies, Inc., Champagne, IL (US)

( * ) Notice: Subject to any disclaimer, the term of this patent is extended or adjusted under 35 U.S.C. 154(b) by 488 days.

(21) Appl. No.: 11/627,731

(22) Filed: Jan. 26, 2007

(65) Prior Publication Data

US 2008/0179961 A1    Jul. 31, 2008

(51) Int. Cl.
  *H02J 7/00*    (2006.01)
(52) U.S. Cl. .................................... 320/132; 324/427
(58) Field of Classification Search ................. 320/132; 324/427; 307/55–58
  See application file for complete search history.

(56) References Cited

U.S. PATENT DOCUMENTS

| | | | |
|---|---|---|---|
| 4,277,692 A | 7/1981 | Small | |
| 4,287,465 A | 9/1981 | Godard et al. | |
| 4,707,774 A | 11/1987 | Kajita | |
| 4,709,318 A | 11/1987 | Gephart et al. | |
| 4,719,550 A | 1/1988 | Powell et al. | |
| 4,725,740 A | 2/1988 | Nakata | |
| 5,041,959 A | 8/1991 | Walker | |
| 5,148,043 A | 9/1992 | Hirata et al. | |
| 5,160,851 A | 11/1992 | McAndrews | |
| 5,309,073 A | 5/1994 | Kaneko et al. | |
| 5,684,385 A | 11/1997 | Guyonneau et al. | |
| 5,721,481 A | 2/1998 | Narita et al. | |
| 5,796,182 A | 8/1998 | Martin | |
| 5,801,519 A * | 9/1998 | Midya et al. ................. 323/222 |
| 5,929,537 A | 7/1999 | Glennon | |
| 5,978,236 A | 11/1999 | Faberman et al. | |
| 5,982,645 A | 11/1999 | Levran et al. | |
| 6,157,168 A | 12/2000 | Malik | |
| 6,201,319 B1 | 3/2001 | Simonelli et al. | |
| 6,225,708 B1 | 5/2001 | Furukawa et al. | |
| 6,311,279 B1 | 10/2001 | Nguyen | |
| 6,369,461 B1 | 4/2002 | Jungreis et al. | |
| 6,445,089 B1 | 9/2002 | Okui | |
| 6,462,507 B2 | 10/2002 | Fisher, Jr. | |
| 6,563,234 B2 | 5/2003 | Hasegawa et al. | |
| 6,614,132 B2 | 9/2003 | Hockney et al. | |
| 6,624,533 B1 | 9/2003 | Swanson et al. | |

(Continued)

*Primary Examiner*—Edward Tso
*Assistant Examiner*—Samuel Berhanu
(74) *Attorney, Agent, or Firm*—Barnes & Thornburg LLP

(57) ABSTRACT

In an electrical power supply having a plurality of switching power converter circuits and configured to supply a voltage to an electrical load, a method of controlling a duty cycle of at least one switch of one of the plurality of switching power converter circuits includes determining a storage voltage produced by the one of the plurality of energy storage devices. The method further includes determining an average storage voltage corresponding to an average of storage voltages produced by each of the plurality of energy storage devices. The method further includes determining at least one control signal as a function of the storage voltage, the average storage voltage, and a reference voltage. The method further includes controlling the duty cycle of the at least one switch of the one of the plurality of switching power converter circuits based upon the at least one control signal.

22 Claims, 7 Drawing Sheets

U.S. PATENT DOCUMENTS

| | | |
|---|---|---|
| 6,657,321 B2 | 12/2003 | Sinha |
| 6,700,802 B2 | 3/2004 | Ulinski et al. |
| 6,727,602 B2 | 4/2004 | Olson |
| 6,765,315 B2 | 7/2004 | Hammerstrom et al. |
| 6,770,984 B2 | 8/2004 | Pai et al. |
| 6,795,322 B2 | 9/2004 | Aihara et al. |
| 6,841,972 B2 * | 1/2005 | Koo ............................ 320/132 |
| 6,881,509 B2 | 4/2005 | Jungreis |
| 6,882,063 B2 | 4/2005 | Droppo et al. |
| 6,928,371 B1 * | 8/2005 | Roshau ......................... 702/63 |
| 2005/0212486 A1 * | 9/2005 | Nakada ....................... 320/132 |
| 2005/0212487 A1 * | 9/2005 | Sodeno ....................... 320/132 |

* cited by examiner

Figure 1:
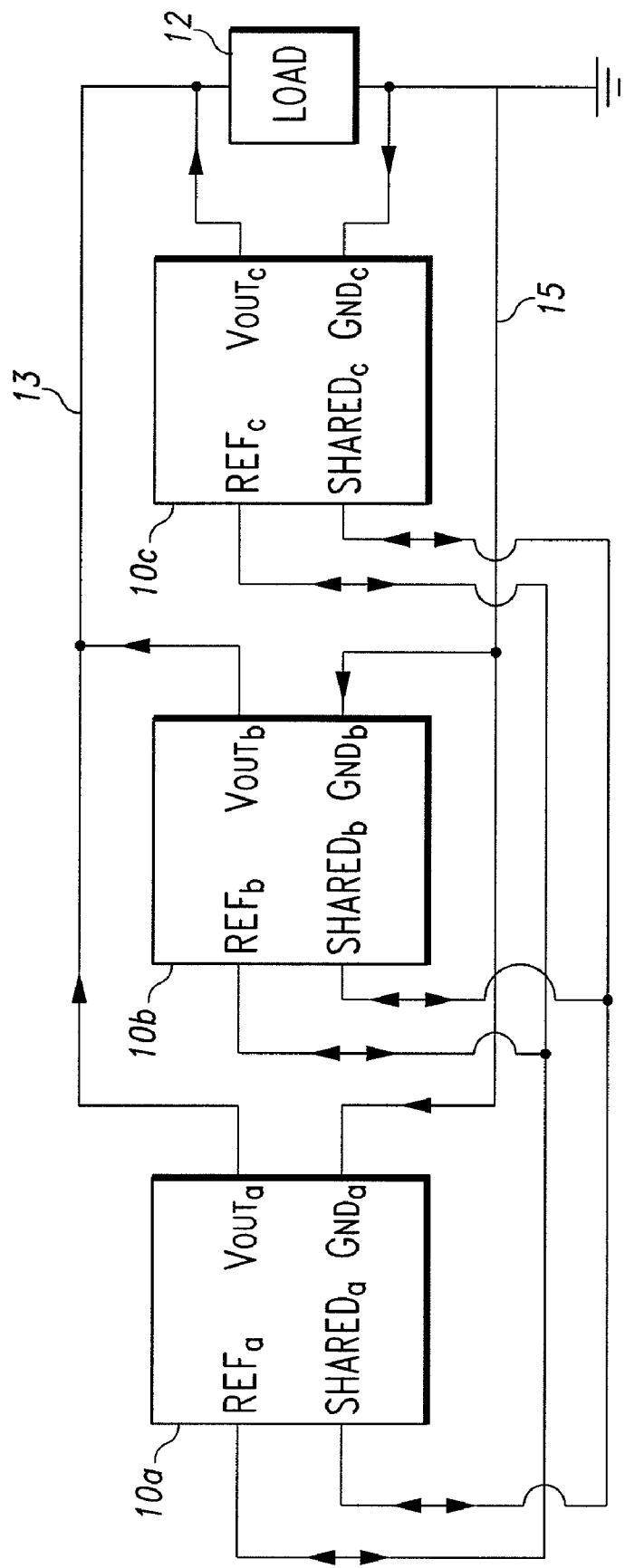

APPARATUS, SYSTEM, AND METHOD FOR CONTROLLING MULTIPLE POWER SUPPLIES

This invention was made with Government support under Contract No. H92222-06-C-0002 awarded by the Department of Defense. The Government has certain rights in the invention.

FIELD OF THE DISCLOSURE

The present disclosure relates generally to controlling power supplies, and more specifically to, controlling power converters used in interconnected power supplies.

BACKGROUND

Long-term unattended electric power sources allow various loads to be powered for great lengths of time without the necessity of replacing any of the components. Some long-term power sources may be a power supply that includes an arrangement of various components such as energy sources, energy storage devices, and power converters. These components are arranged such that the energy sources provide power to both the load and to the energy storage devices for storage, which allow the energy storage devices to supply power to the load if the energy sources are unavailable. Allowing interconnection of a number of power supplies would increase both the storage capacity and load capacity. However, the challenge exists to control the interconnected power supplies to ensure that individual power supplies charge and discharge uniformly. Many systems attempting to achieve this to date require the use of a master controller or peer-to-peer communication among the interconnected power supplies. Other attempts have implemented methods such as a "democratic sharing" in which a conventional voltage mode controller includes an extra term to compensate for the difference between the output current of a particular power supply and the average output current of all of the interconnected power converters.

SUMMARY

The present invention may comprise one or more of the features recited in the attached claims, and/or one or more of the following features and combination thereof. According to one aspect of the disclosure, in an electrical power supply having a plurality of switching power converter circuits and configured to supply a voltage to an electrical load, a method of controlling a duty cycle of at least one switch of one of the plurality of switching power converter circuit may comprise determining a storage voltage produced by one of a number of energy storage devices. The method may further comprise determining an average storage voltage corresponding to an average of storage voltages produced by each of the plurality of energy storage devices. The method may further comprise determining at least one control signal as a function of the storage voltage, the average storage voltage, and a reference voltage. The method may further comprise controlling the duty cycle of the at least one switch of the one of the plurality of switching power converter circuits based upon the at least one control signal.

According to another aspect of the disclosure, an electrical power supply configured to a supply a voltage to an electrical load may comprise a first energy storage device. The power supply may further comprise a switching power converter circuit having a first input configured to receive a control signal and a second input configured to receive a first storage voltage produced by the first energy storage device. The switching power converter circuit may be configured to produce the voltage supplied to the electrical load based on the first storage voltage and having a duty cycle defined by the control signal. The power supply may further comprise a controller having a first input configured to receive the first storage voltage, a second input configured to receive an average voltage corresponding to an average of storage voltages produced by a number of other energy storage devices and the first storage voltage, and a third input configured to receive a reference voltage. The controller may be further configured to produce the first control signal as a function of the first storage voltage, the average voltage, and the reference voltage.

According to another aspect of the disclosure, a power supply system may comprise a plurality of power supplies each including a first and second output terminal. Each first output terminal of each of the plurality of power supplies may be electrically connected to one another and the second output terminals of each of the plurality of power supplies may be electrically connected to one another. Each of the plurality of power supplies may include an energy storage device configured to produce a storage voltage and each energy storage device may be electrically connected to a common electrical node through as separate resistive element. The voltage at the electrical node may be the average voltage of the storage voltage produced by each of the energy storage devices. Each of the plurality of power supplies may further include a switching power converter circuit having a first input configured to receive a control signal and a second input configured to receive the storage voltage produced by the energy storage device. The switching power converter circuit may be configured to produce an output voltage across the first and second output terminals and having a duty cycle defined by the control signal. Each of the plurality of power supplies may further include a controller having a first input configured to receive the storage voltage, a second input configured to receive the average voltage, and a third input configured to receive a reference voltage. The controller may be configured to produce the control signal as a based upon the storage voltage, the average voltage, and a reference voltage.

BRIEF DESCRIPTION OF THE DRAWINGS

The detailed description particularly refers to the accompanying figures in which:

FIG. 1 is a diagrammatic view of a number of exemplary power supplies interconnected to one another;

FIG. 2 is a diagrammatic view of an exemplary power supply;

FIG. 3 is a diagrammatic view of an exemplary power supply;

FIG. 4 is a diagrammatic view of an exemplary power converter;

FIG. 5 is a flowchart of an exemplary control strategy for controlling a power supply;

FIG. 6 is a diagrammatic view of an exemplary controller for controlling a power supply;

FIG. 7 is a diagrammatic view of another exemplary power converter; and

FIG. 8 is a diagrammatic view of another exemplary power converter.

DETAILED DESCRIPTION OF THE DRAWINGS

As will herein be described in more detail, FIG. 1 shows a diagrammatic view of an exemplary embodiment of a number of power supplies 10a-10c electrically connected to one another to provide a voltage to an electrical load 12. The arrows shown in FIG. 1 represent exemplary flows of energy that are used for supplying the load 12 as well as controlling the operation of the power supplies 10. In one embodiment, the load 12 may be a fixed or variable load, such as a 5-W-hr/day average load in 30 W pulses of short duration. Alternatively, the load 12 may have variable resistance and/or reactance. It should be appreciated that the load 12 may be linear or non-linear.

The power supply configuration shown in FIG. 1 allows the power supplies to act together such that sharing of the load occurs among the power supplies. As described in further detail herein, the output voltage of each power supply is controlled such that a regulated voltage may be applied to the load 12. The power supplies 10a-c are each connected to a positive load line 13 and ground 15. Each power supply 10a-c also includes a "REF" terminal and a "SHARED" terminal. The REF terminals of each power supply 10 may be interconnected such that each power supply 10 may each receive an average reference signal, such as a reference voltage, for determining an output voltage supplied to the load 12. The SHARED terminals of each power supply 10 may be interconnected such that each can be controlled to proportionally share supplying the load 12. Each power supply 10 shown in FIG. 1 is configured so that any number of power supplies 10 may be connected in the manner shown in FIG. 1 to achieve redundancy and increased power and energy capability. The power and energy grow arithmetically and no de-rating is necessary.

This configuration shown in FIG. 1 does not require the interconnected power supplies to have equal ratings. For example, if power supply 10a has twice the energy storage and power delivery ratings of the power supplies 10b-c, the power supply 10a will handle 50% of the load and storage requirement, while the power supplies 10b-c will each handle 25%. This "relative size sharing" allows each power supply having different ratings based on energy storage to work in unison for providing a regulated output voltage through connection to one another in the exemplary configuration shown in FIG. 1. The configuration shown in FIG. 1 also allows the elimination of the necessity for a master controller because the power supplies 10 will function in the manner described when connected as shown in FIG. 1.

Figure 2:
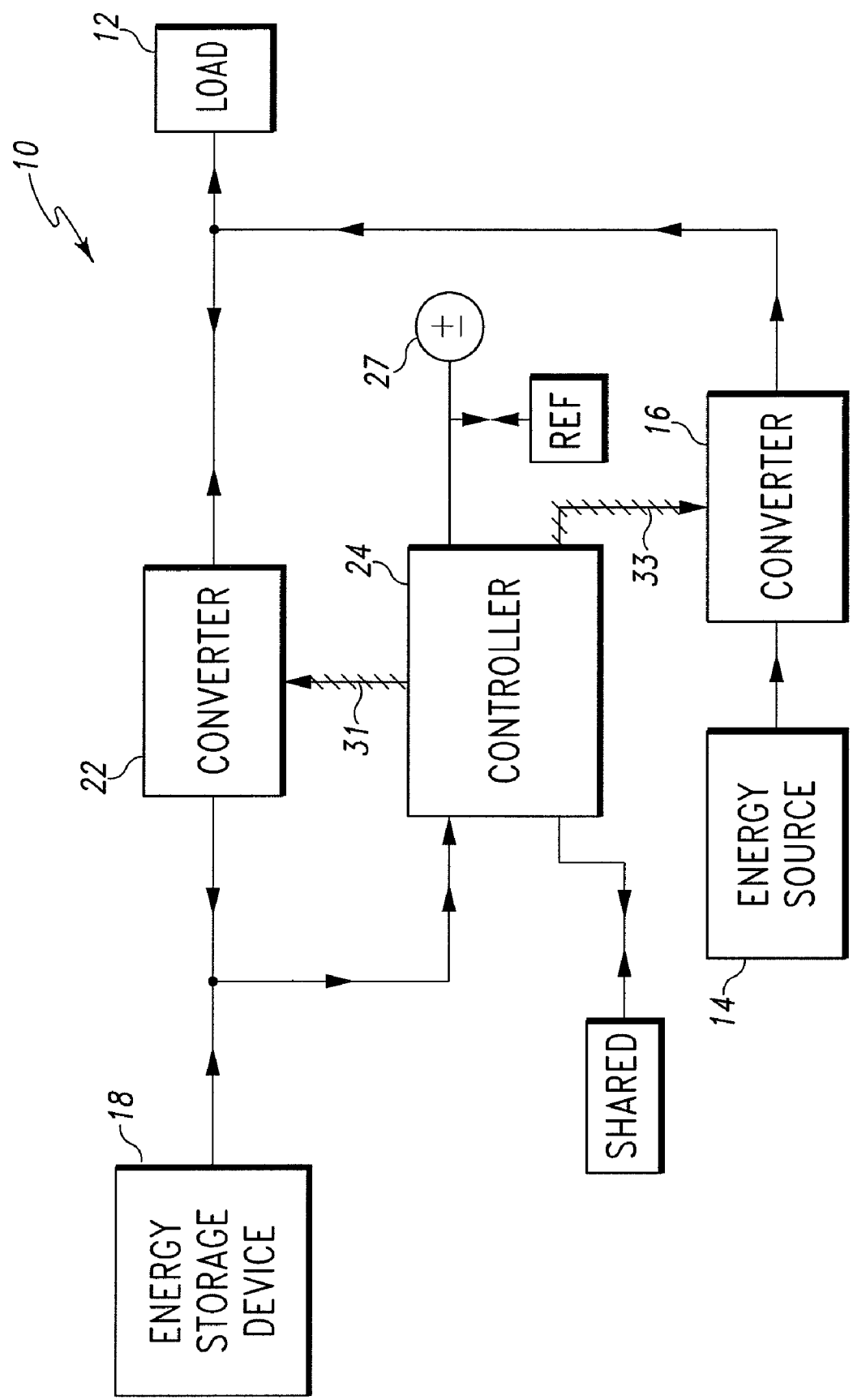

FIG. 2 is a diagrammatic view of an exemplary power supply 10 electrically connected to a load 12. The load 12 is configured to receive power from both an energy source 14 and an energy storage device 18. In the exemplary embodiment of FIG. 2, the energy source 14 and the energy storage device 18 are connected in a common electrical bus arrangement allowing the load 12 to receive a voltage from both the energy source 14 and the energy storage device 18. The energy source 14 is electrically connected to a power converter 16, which is electrically connected to the load 12. In this exemplary embodiment, the power converter 16 is configured to deliver voltage from the energy source 14 to the load 12.

The energy storage device 18 may include a number of ultracapacitors, which, among electrical and electrochemical storage devices, are typically known to provide the highest number of charge and discharge cycles and are also capable of achieving a substantially long life when appropriately implemented. However, it should be appreciated that various types of energy storage devices 18 may be used in the power supply 10. For example, rechargeable batteries may be used, as well as flywheels or other rechargeable mechanical devices.

The energy storage device 18 is electrically connected to a power converter 22. The power converter 22 is electrically connected to the load 12 and may deliver energy from the energy storage device 18 to the load 12 and deliver energy from the energy source 14 to the energy storage device 18. A controller 24 is configured to receive output signals generated by the energy storage device 18, the converter 22, and a reference signal generator 27. The controller 24 is also configured to receive signals at the REF and SHARED terminals as described in FIG. 1 for controlling the output voltage of the power supply 10. The controller 24 may also generate control signals that may be provided to both the power converter 22 and a power converter 16 as indicated by control lines 31, 33.

Various devices may be used for the energy source 14. For example, electrical energy sources such as solar panels and fuel cells, as well as mechanical energy sources such as rotary generators, water wheels, and wind generators may also be used for an energy source 14. The power converter 16 may be a unidirectional dc-dc boost converter in the exemplary embodiment of the power supply 10. The unidirectional configuration of converter 16 prevents energy from flowing into the energy source 14, which can cause damage to the energy source 14. The converter 16 is electrically connected to load 12, which allows the energy source 14 to provide power to the load 12 through control of the dc-dc converter 16.

The energy source 14 may be controlled to maximize its performance and longevity. For example, in the case of a solar panel or wind source, the controller 24 draws maximum available power whenever power is available and useful. In the case of a fuel cell or rotary generator, the energy source 14 may be controlled to maintain operation at an optimum power point, selected for the specific technology. The power supply 10 may be used as an unattended long-term power supply, therefore, energy sources 14 requiring no maintenance are most suitable, such as solar panels or other devices capable of extracting energy from the immediate surroundings. Almost all plausible energy sources 14 used for long-term generation have an identified optimum operating condition. The converter 16 may be controlled to enforce this optimum. This is intended to make the energy source 14 operation nearly independent of the load 12 and the energy storage device 18. In this exemplary embodiment, the converter 16 may be configured to incorporate a maximum power point tracker (MPPT), such as that disclosed in U.S. Pat. No. 5,801,519, which is incorporated by reference herein. Use of the MPPT, for example, ensures that a solar panel generates maximum power without regard to output voltage or other conditions, which allows the energy source 14 to be used whenever useful, and energy is processed in a manner unaffected by the system output voltage supplied to the load 12.

During operation, the load 12 may need power for operation from the power supply 10. If the energy source 14 is producing a voltage, energy may be supplied through the converter 16 to the load 12. When the load 12 does not require power, for example, during a dormancy period, the energy source 14 can supply energy to charge the energy storage device 18. Once the energy storage device 18 is completely charged and the load 12 does not require power, the controller 24 generates a signal that commands the converter 16 to power off, so that energy is no longer transferred through the converter 16 from the energy source 14.

When the load 12 requires power, but the energy source 14 is unable to supply the required power, the energy storage device 18 may be used to supply a voltage to the load 12 when adequately charged. Once the energy source 14 is again capable of supplying energy, the converter 16 may provide power to the load 12 and recharge the energy storage device 18 as necessary.

Figure 3:
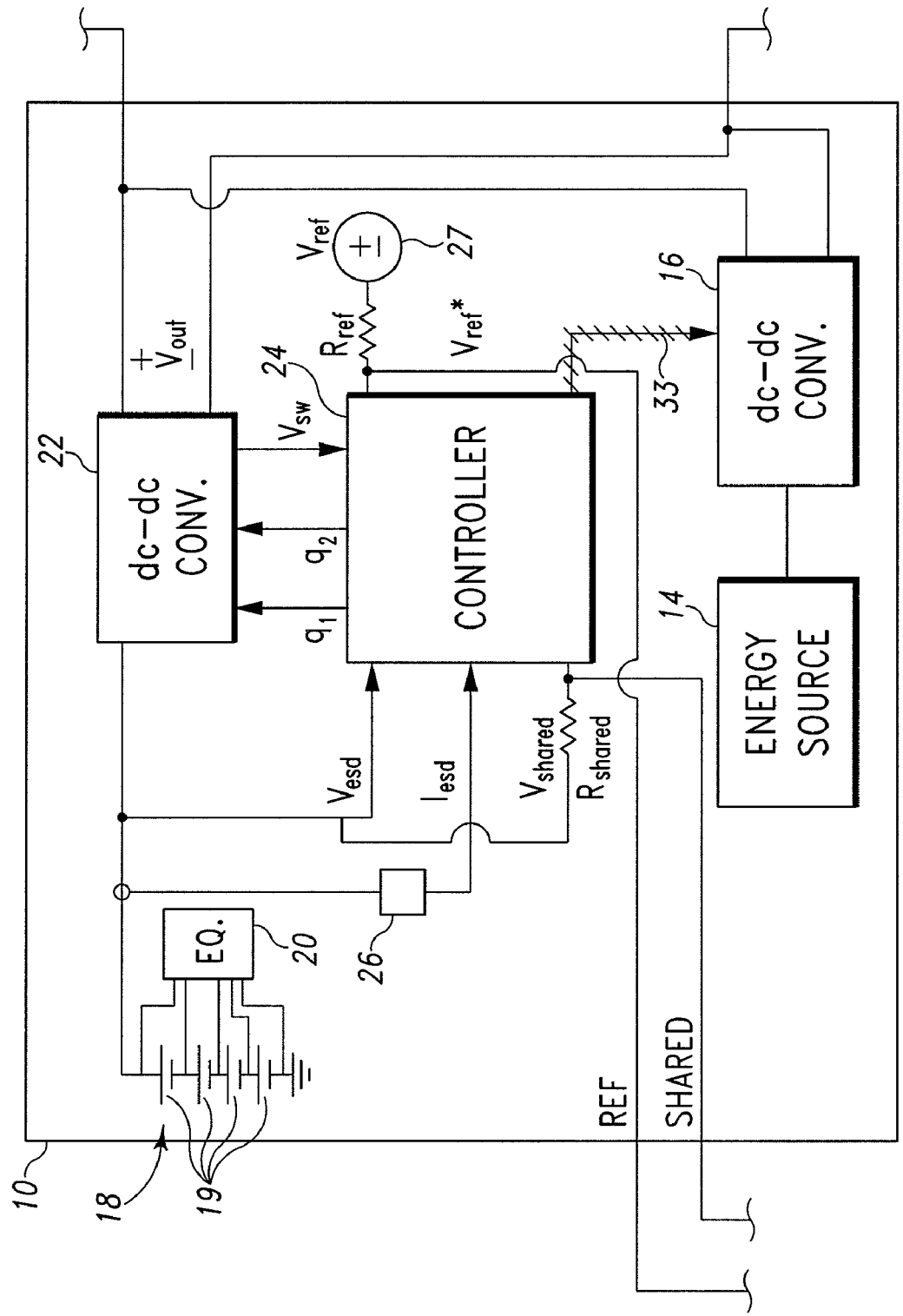

FIG. 3 shows a internal view of one of the power supplies 10 shown interconnected in FIG. 1. In FIG. 3, the energy storage device 18 includes a number of ultracapacitors 19, which are configured in a series string. Ultracapacitors and rechargeable batteries used as the energy storage device 18 may be configured in a series string owing to their relatively low terminal voltages. To promote longevity, the individual storage elements, such as ultracapacitors, arranged in the series string should be balanced in voltage so that each element is at substantially the same voltage.

In FIG. 3, an equalizer 20 is connected to the energy storage device 18 to balance the voltage of the ultracapacitors 19. Balancing technology such as that disclosed in U.S. Pat. No. 5,710,504, which is incorporated by reference herein, may be used with energy storage devices 18, such as the equalizer 20, to extend the life of the energy storage devices. In ultracapacitors and certain battery types, such as nickel metal hydride (NiMH) rechargeable cells for example, longevity is further extended by limiting the charge voltage. Balancing of the energy storage device 18 also allows the voltage to be set to any desired value. The energy storage device 18 can be balanced even if a decreased voltage is desired. If the power supplies 10 are unattended, the energy storage device 18 is controlled to permit operation even when the energy source 14 is unavailable. In this exemplary embodiment, a dc-dc bi-directional converter is used for the converter 22, which allows a voltage to be supplied to and from the energy storage device 18.

As similarly described in FIG. 2, during operation, the converter 22 allows the storage voltage from the energy storage device 18 to be selectively controlled to supply the load 12 with an appropriate amount of voltage and allow power to be provided to the energy storage device 18 from the energy source 14 for recharging. The controller 24 provides control signals to the converters 16, 22 to appropriately operate the power supply 10. During operation, the load 12 may need power for operation from the power supply 10. If the energy source 14 is generating energy, for example, during absorption of solar energy by a solar panel, power can be supplied through the converter 16 to the load 12. When the load 12 does not require as much power as the energy source 14 can provide, the energy source 14 can supply a voltage to charge the energy storage device 18. If the energy storage device 18 is fully recharged and the load 12 does not require power, the controller 24 can generate a signal, as shown in FIG. 3, to the converter 16 for deactivation.

When the load 12 requires power, but the energy source 14 is unable to supply the required power, the energy storage device 18 is used to supply a voltage to the load 12 allowing sufficient power to be drawn by the load 12. This can occur, for example, when solar energy is not being provided to a solar panel used as the energy source 14. The energy storage device 18 can supply the voltage required to serve the load 12. Once the energy source 14 is again absorbing solar energy, it can provide a sufficient voltage to the load 12 and recharge the energy storage devices 18 as necessary.

In the configuration of FIG. 3, a resistive element $R_{shared}$ is connected between one terminal of the energy storage device 18 and the controller 24. The input into the controller 24 is connected to the SHARED terminal. Connecting each of the SHARED terminals together in the manner shown in FIG. 1 creates the average energy storage voltage $V_{shared}$, which may be input into each controller 24. This allows each controller 24 of each power supply 10 to receive the resistor average storage voltage of the energy storage devices 18*a-c*. The resistance $R_{shared}$ may be inversely proportional to the capacity of the module, to simplify interconnection of units with different ratings. The interconnection of the SHARED terminals provides the following equation for $V_{shared}$:

$$V_{shared} = \frac{1}{N} \sum_{j=1}^{N} V_{shared,j} \tag{1}$$

where N is the number modules and $V_{shared,j}$ is the output voltage of each energy storage device 18.

Each controller 24 also receives the storage voltage $V_{esd}$ of its respective energy storage device 18, as exemplified in FIG. 3. A current sensor 26 may be connected to the output of each energy storage device 18. This allows the output current $I_{esd}$ of the energy storage device 18 to be provided to each controller as shown in FIG. 3.

Each controller 24 also receives a common reference voltage $V_{ref}^*$, which is provided to each controller 24 to which the output $V_{out}$ of each converter 22 is to be controlled. In this exemplary embodiment, each power supply 10 includes an internal reference voltage generator 27 providing the voltage signal $V_{ref}$. The internal reference voltage can be fixed, variable, or the output of a feedback loop derived from the output voltage $V_{out}$. Similar to the manner in which the average resistor voltage $V_{shared}$ is provided, the common reference voltage $V_{ref}^*$ may be provided, which is the resistor ($R_{ref}$) average voltage of the internally generated reference voltage $V_{ref-c}$. The interconnection of the REF terminals provides the following equation for $V_{ref}^*$:

$$V_{ref}^* = \frac{1}{N} \sum_{j=1}^{N} V_{ref,j} \tag{2}$$

This allows each controller 24 to have the same reference voltage towards which to drive the output of the converter 22, eliminating any variation between the internally generated reference voltages $V_{refa-c}$. It should be appreciated that alternatively, a master reference voltage signal may also be generated external to the power supplies, which would provide a single reference voltage signal to each controller 24.

During operation, when the energy storage devices 18 are required to supply voltage to the load 12, each controller 24 controls its respective converter 22 to provide the appropriate amount of output voltage $V_{out}$. The configuration shown in FIG. 1 allows the duty cycle of each converter 22 to be controlled so that the energy storage devices 18 of each power supply 10 are all substantially at the same voltage, so that the power supplied to the load 12 is regulated allowing for proper supply. Allowing an imbalance to occur among energy storage devices 18*a-c*, causes undesirable effects, which may cause the load 12 being supplied to not operate properly and diminish the life of the energy storage devices 18.

Figure 4:
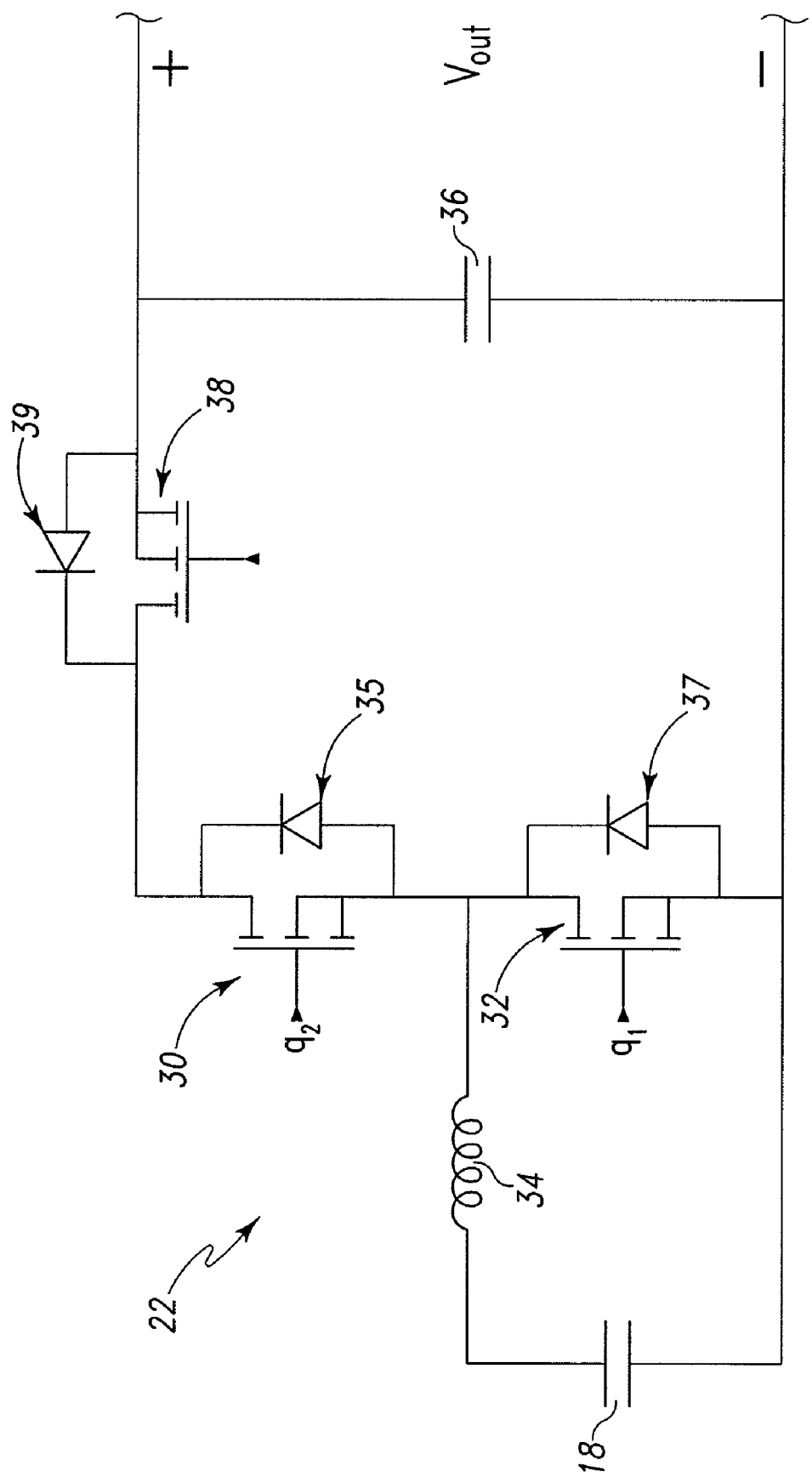

Each controller 24 is configured to provide control signals $q_1$, $q_2$ to a respective converter 22. In the exemplary embodiment of FIG. 3, controller 24 provides control signals $q_1$, $q_2$ in the form of gate signals to switches 32, 30, respectively, (see FIG. 4) in converter 22. FIG. 4 shows the components of converter 22, which is a bidirectional boost converter in this exemplary embodiment. The converter 22 includes the switch 32, which is turned on to charge the inductor 34 and then subsequently turned off to allow the stored energy in an inductor 34 and the output voltage of the energy storage device 18 to be applied to the load 12. The switch 30 is turned on to connect the inductor 34 to the output of the power supply 10. An additional series switch 38 is added to allow power to flow in the reverse direction to recharge the energy storage device. The switches are operated such that neither will be turned on at the same time. In this exemplary embodiment, switches 30, 32, 38 are metal oxide semiconductor field-effect transistor (MOSFET) and each are shown having a diode 35, 37, 39, respectively, placed in parallel. However, it should be appreciated that various types of switches may be used. A capacitor 36 filters the voltage $V_{out}$. Current limiting may be enforced by means of a separate current sensor. The parasitic voltages $V_{sw}$ of the switches 30 is provided to each respective controller 24 for use in controlling power supply 10 as described regarding FIGS. 5 and 6.

Figure 5:
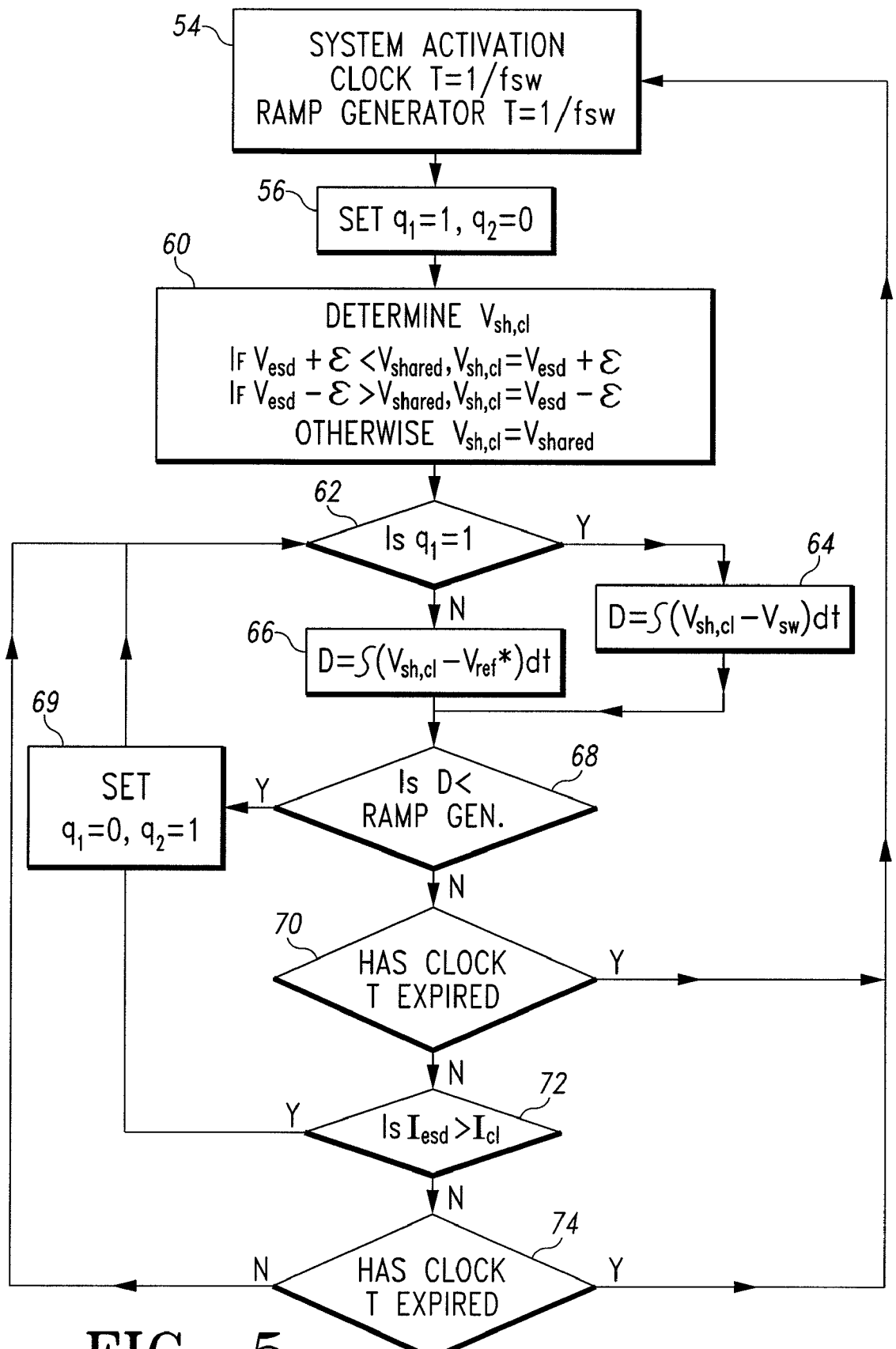

An exemplary control strategy allowing the modules to be controlled in a manner allowing a number of power supplies 10 to be connected for supplying a regulated output voltage to a load is shown through a flowchart in FIG. 5. This exemplary control strategy is a modified version of sensorless current mode (SCM) control. In SCM control, the integral of the voltage across inductor 34 is used to approximate the flux in the inductor 34. By replacing the actual output voltage of the converter 22 with the desired output voltage $V_{ref}^*$, regulation is achieved in an open-loop sense. To achieve closed-loop control in alternative embodiments, $V_{ref}^*$ may be replaced by $V_{ref,o}$, which is derived from the error $V_{ref}^* - V_{out}$ through standard control techniques. The use of SCM control allows output voltage regulation of the energy storage device 18.

The modified SCM control law used in the exemplary embodiment of FIGS. 1-3 allows multiple modules to be interconnected. In a standard boost power converter, such as converter 22, the SCM control law is $$D = k\int(V_{in} - q_2 V_{ref})dt \qquad (3)$$

where D is the duty cycle of the switch 32, $V_{in}$ is the input voltage of the converter 22, $V_{ref}$ is the reference voltage, and $q_2$ is high (=1) when the upper switch 30 is on and the inductor 34 is connected to the output bus. In the modified SCM control, as provided below in Eqn. (3), $V_{in}$ may be replaced with $V_{shared}$, which acts as the input to the power converters 22. The determination of k is beyond the scope of this disclosure. However, it should be noted that the value of k is a chosen for good system dynamics and is related to the switching frequency and circuit parameters. The controller 24 may have an internal clock having a switching frequency of $f_{sw}$.

By modifying SCM control in this manner, all of the interconnected power supplies 10 are driven with the same input voltage. Simultaneously, the voltage supplied to the load 12 is driven to the desired value. This allows each energy storage device 18 to be properly adjusted to boost or lower its output voltage to coincide with the other interconnected energy storage devices 18. For example, for $i^{th}$ power supply 10, $V_{in,i} < V_{shared}$. In this case, the duty cycle D will be less than necessary to properly boost from $V_{in,i}$ to $V_{ref}$. The extra voltage will drop across all of the parasitic resistances (not shown), which are generally small, and drive differential current into the energy storage devices 18 that require boosting. Similarly, if $V_{in,i} > V_{shared}$, the duty cycle will be too high, drawing differential current out of the energy storage device 18 needing to be lowered in output voltage. The process will continue until all the energy storage modules 18 operate at the same storage voltage.

Figure 6:
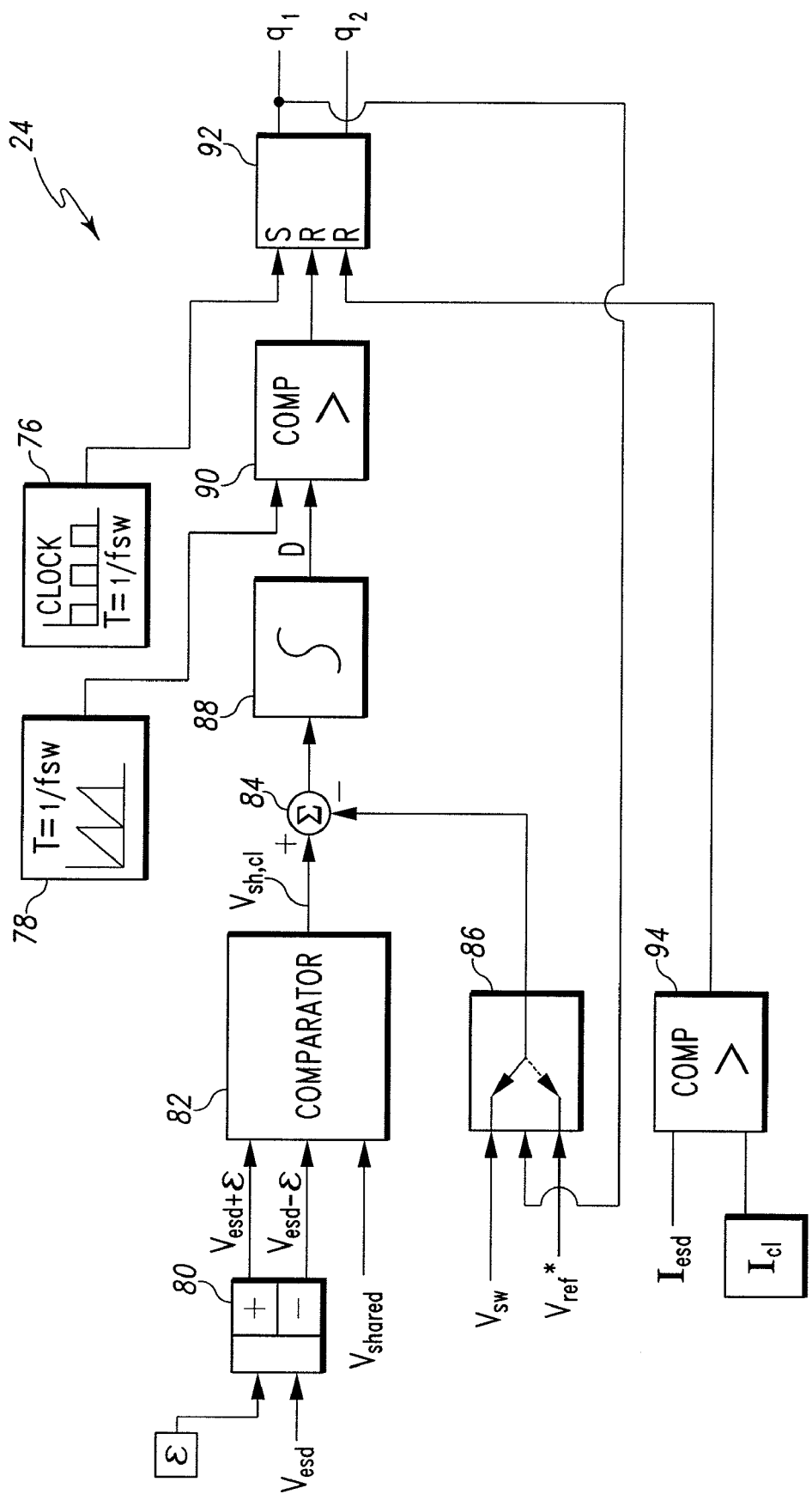

However, in some embodiments $V_{shared}$ in place of $V_{in,i}$ can adversely affect output voltage regulation. The control strategy shown in FIGS. 5 and 6 is configured to take this into consideration. In this exemplary control strategy, a limited version of $V_{shared}$ is used, whereby the value $V_{shared}$ received by each controller 24 is limited to being no more or less than $\pm\in$ different from $V_{in,i}$. The value of $\in$ is chosen to trade output voltage regulation for speed of convergence for energy storage devices 18 of different voltages. The differential current acting to force equal energy storage voltages is proportional to $\in$, but so also is the output voltage error of the power converter 22. Otherwise, the output becomes unregulated when modules that are in different states of charge are interconnected. Typically, the value for $\in$ will be predetermined and established internally of the controller 24.

The energy storage devices 18 are balanced using the $V_{shared}$ allowing the power supplies 10 to be used for long term applications. FIG. 5 shows an exemplary control strategy that controller 24 may be used for with a power supply 10. The control law equation used to determine the duty cycle of the power converters 22 is:

$$D = k\int(V_{sh,cl} - q_1 V_{sw} - q_2 V_{ref}^*)dt \qquad (4)$$

which may be established through the exemplary embodiment of the control strategy shown in FIGS. 5 and 6. In Eqn. (4), $q_1=1$, $q_2=0$ when $q_1$ is at a logic high and $q_2$ is at a logic low, and $q_2=1$, $q_1=0$ when $q_2$ is at a logic high and $q_1$ is at a logic low. $V_{sh,cl}$ represents the clamped average resistor voltage $V_{shared}$ when the controller 24 is configured to only use a voltage value between $V_{esd}+\in$ and $V_{esd}-\in$.

In FIG. 5, operation 54 includes system activation and indicates that a clock signal is generated having a period of $T=(1/f_{sw})$. When the clock signal is activated, a ramp generator simultaneously generates an output signal having a period of $T=(1/f_{sw})$. In operation 56, the gate signal $q_1$ for switch 32 is set to a logic high (=1) and $q_2$ is set to a logic low (=0). This initially connects the energy storage device 18 between the energy storage device 14 and ground. During operation, the controller 24 may receive a number of input signals, such as $V_{esd}$, $I_{esd}$, $V_{shared}$, $V_{ref}^*$, and $V_{sw}$, which have been previously described. Once the input signals have been received, $V_{sh,cl}$ may be established. In operation 60, $V_{shared}$ is compared to the upper and lower limits of $V_{esd}+\in$ and $V_{esd}-\in$. If $V_{shared}$ is between the limits, then $V_{sh,cl}=V_{shared}$. If $V_{shared}$ is above the upper limit, $V_{sh,cl}$ will be set at $V_{esd}+\in$. If $V_{shared}$ is below the lower limit, $V_{sc,cl}$ will be set at $V_{esd}-\in$. With $V_{sh,cl}$ established, the duty cycle of the converter 16 can be established. With $q_1$ initially set at a logic high, operation 62 determines if $q_1$ is set at a logic high. If so, operation 64 determines the duty cycle according to Eqn. (4) without $V_{ref}^*$ since $q_2$ is low (=0). If $q_1$ is low, the duty cycle of the converter 22 determined according to Eqn. (4) without $V_{sw}$.

As the duty cycle is being dynamically determined, the value of the duty cycle D is compared to the amplitude of the ramp signal in operation 68. While the duty cycle is greater than the amplitude of the ramp signal, operation 70 is performed to determine if the clock signal period has expired. If so, operation 56 is performed setting $q_1$ to a logic high (=1). If the clock period has not expired, the current $I_{esd}$ is compared to a current limit $I_{cl}$ in operation 72. If the current limit is not exceeded, the clock is checked for period expiration in operation 74. If the period has expired, operation 56 is performed. If the duty cycle D is less than the amplitude of the ramp generator, $q_1$ is set to 0 and $q_2$ is set to 1, which changes the duty cycle equation to that shown in operation 66. This also connects the inductor from the energy storage device 18 to the load 12.

If in operation 68, the duty cycle becomes less than the ramp signal or if in operation 72 the current $I_{esd}$ becomes greater than the current limit $I_{cl}$, $q_1$ is set to a logic low (=0)

and $q_2$ is set to a logic high (=1) and operation 62 is performed, which will ultimately cause the duty cycle to be calculated according to operation 66.

It should be appreciated that the operations shown in FIG. 5 may be implemented through the controller 24 configured to perform all of the operations simultaneously to provide a dynamic control strategy. It should further be appreciated some operations may not be necessary to control the converter 22 appropriately, or some operations may be rearranged in the order disclosed in FIG. 5 for appropriate control of the converter 22.

FIG. 6 shows a controller 24 configured to perform the operations of FIG. 5. The controller 24 is shown to include an internal clock 76 having a frequency of $f_{sw}$ and providing a clocking signal. The controller 24 is also shown to include an internal ramp generator 78 also having a switching frequency of $f_{sw}$ and is synchronized with the clock 76. The controller 24 receives input signals, which in this embodiment includes $V_{esd}$, $I_{esd}$, $V_{shared}$, $V_{sw}$, and $V_{ref}^*$ to ultimately provide the gate signals $q_1$, $q_2$ for switches 32, 30, respectively. $V_{esd}$ and the internally generated $\in$ are provided to limit generator 80, which establishes the upper limit $V_{esd}+\in$ and the lower limit $V_{esd}-\in$.

These limits are provided to a comparator 82, which compares $V_{shared}$ to the upper and lower limit, and establishes $V_{sh,cl}$ in the manner previously described. The output of comparator 82 is provided to a summation point 84. $V_{sw}$ and $V_{ref}^*$ are provided to a switch 86. The switch 86 also receives the control signal $q_1$. When $q_1$ is high, the switch provides an output signal of $V_{sw}$ and when $q_1$ is low ($q_2$ is high) provides an output signal of $V_{ref}^*$. The output of the switch 86 is also provided to summation point 84 to be subtracted according to Eqn. (4). The output of summation point 84 is provided to integrator 88, which provides the duty cycle D at its output. The duty cycle D and the output of the ramp generator 78 are compared by comparator 90, which provides a logic high signal when the duty cycle value exceeds the amplitude of the ramp generator 78. The comparator 90 provides its output to a RESET input of latch 92. Latch 92 receives the output of the clock 76 at its SET input. The latch 72 also receives the output of comparator 94 at another RESET input. A comparator 94 receives $I_{esd}$ and compares it to a predetermined internally set current limit $I_{cl}$. The comparator 94 provides a logic high output when the current $I_{esd}$ exceeds the current limit $I_{cl}$.

At the start of each PWM clock period, the latch is SET, making $q_1$ high and $q_2$ low. When the output signal of the ramp generator 78 crosses the output signal of the integrator 88, the output of comparator 90 causes the latch 92 to reset, making $q_1$ low and $q_2$ high. Under normal circumstances, this will create gate pulses to $q_1$ with duty cycle D. If the current limit $I_{cl}$ is exceeded by $I_{esd}$, comparator 94 provides a logic high to latch 92 making $q_1$ low and $q_2$ high. The current limit is an optional feature that enhances fault tolerance, but is not necessary for proper operation.

It should be appreciated that the configuration of FIG. 6 is an exemplary one and that each component of controller 24 can be implemented through numerous circuit elements. It should also be appreciated that while the controller 24 of FIG. 6 is substantially analog in nature, the controller 24 may be configured through digital components such as a microprocessor and a memory device, with the microprocessor programmed to operate the converter 22 in the manner previously described.

The interconnected power supplies 10, as shown in FIG. 2, operate at slightly different switching frequencies based on the tolerance of the components used for the clock 76. It should be appreciated that a global clock 76 may be used for synchronization. Synchronization may be useful to eliminate beat frequencies in the output voltage, that is, fluctuations related to the difference between switching frequencies.

Figure 7:
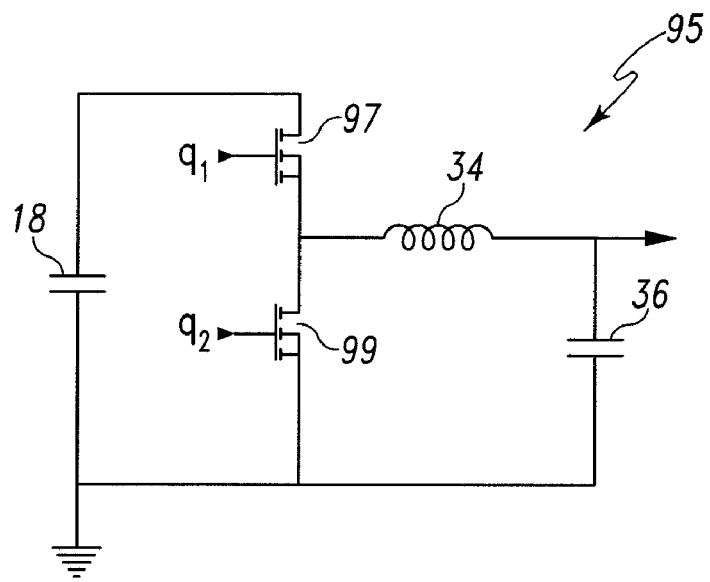

It should be appreciated that the power supply 10 may implement other converter topologies. For example, FIG. 7 shows a diagrammatic view of a buck converter 95 that may be used for the converter 22. The buck converter 95 includes switches 97, 99. Use of a buck converter provides the following equation for the duty cycle of the converter 22:

$$D=k\!\!\int\!(q_1 V_{sh,cl}-q_2 V_{sw}-V_{ref}^*)dt \tag{5}$$

where q1, q2 are the switching signals corresponding to the switches 97, 99.

Figure 8:
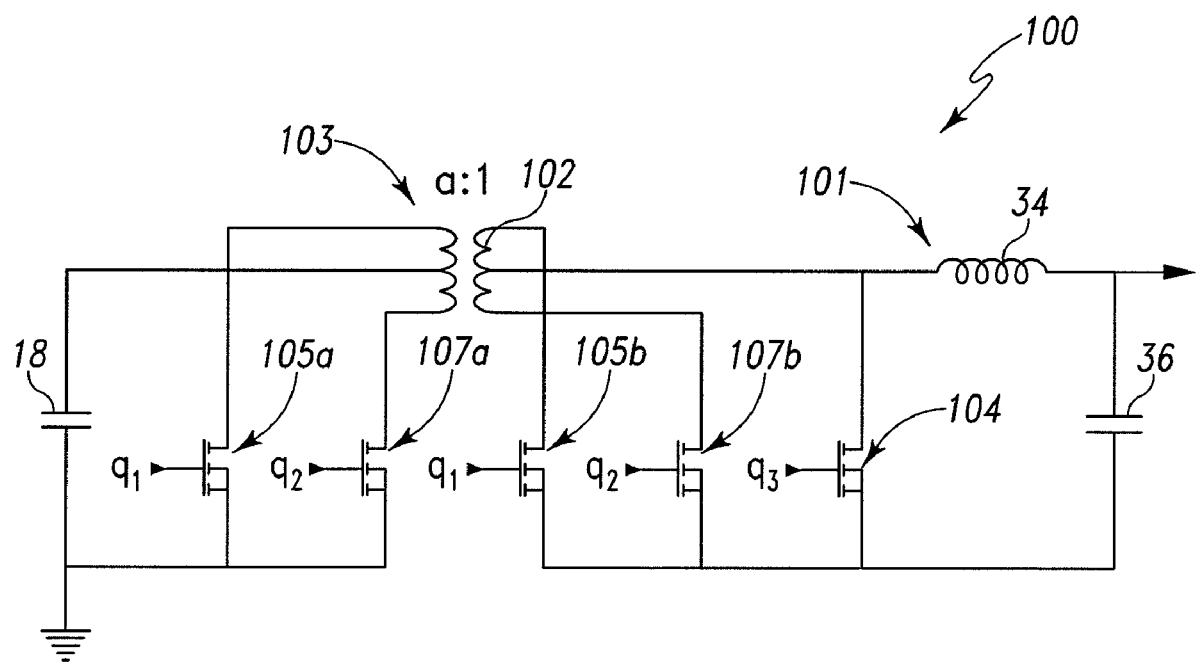

Alternatively, a push-pull converter 100, such as that shown in FIG. 8, may be used for the converter 22. Use of the push-pull converter 100 provides the following equation for the duty cycle of the converter 22:

$$D = k\int\left[(q_1+q_2)\frac{V_x}{a} - q_3 V_{sw} - V_{ref}^*\right]dt \tag{6}$$

where q3 of switch 104 is the switching function of the synchronous rectifier 101 on the secondary winding 102 of the transformer 103 and "a" is the turns ratio. The signal q1 corresponds to switches 105*a,b* and the signal q2 corresponds to switches 107*a,b* for the push-pull converter 100. Use of isolated converter types, such as push-pull, forward, half-bridge, full bridge, etc., provide increased design flexibility through manipulation of the turns ratio.

There are a plurality of advantages of the present disclosure arising from the various features of the apparatus and methods described herein. It will be noted that alternative embodiments of the apparatus and methods of the present disclosure may not include all of the features described yet still benefit from at least some of the advantages of such features. Those of ordinary skill in the art may readily devise their own implementations of an apparatus and method that incorporate one or more of the features of the present disclosure and fall within the spirit and scope of the present disclosure.

The invention claimed is:

1. In an electrical power supply having a plurality of switching power converter circuits and configured to supply a voltage to an electrical load, a method of controlling a duty cycle of at least one switch of one of the plurality of switching power converter circuits comprising:
   determining a storage voltage produced by one of a plurality of energy storage devices,
   determining an average storage voltage corresponding to an average of storage voltages produced by each of the plurality of energy storage devices,
   determining at least one control signal as a function of the storage voltage, the average storage voltage, and a reference voltage, and
   controlling the duty cycle of the at least one switch of the one of the plurality of switching power converter circuits based upon the at least one control signal.

2. The method of claim 1, wherein the determining at least one control signal comprises determining at least one control signal as a function of a predetermined upper limit when the average storage voltage is greater than the predetermined upper limit and as a function of a lower predetermined limit when the average storage voltage is less than the predetermined lower limit.

3. The method of claim 2, wherein the predetermined upper limit and the predetermined lower limit are based upon the storage voltage.

4. The method of claim 1, wherein the determining an average storage voltage comprises determining the voltage at an electrical node that is electrically connected to an output terminal of each of the plurality of energy storage devices through a respective resistive element.

5. The method of claim 1, wherein the determining at least one control signal comprises determining at least one control signal as a function of power losses associated with the at least one switch of the one of the plurality of switching power converter circuits.

6. The method of claim 5, wherein the at least one switch comprises a first and second switch, and
wherein, the controlling the duty cycle comprises controlling the duty cycle of the first switch of the one of the plurality of switching power converters according to the equation:

$$D = k \int (V_{sh,cl} - q_1 V_{sw} - q_2 V_{ref}^*) dt,$$

wherein:
D is the duty cycle of the first switch, k is a predetermined constant, $V_{sh,cl}$ is the average storage voltage bounded by a predetermined upper and lower limit, $q_1$ is the logic state of the first switch, $V_{sw}$ is the voltage associated with the power losses of the first switch of each of the plurality of switching power converter circuits, $q_2$ is the logic state of the second switch, and $V_{ref}^*$ is the reference voltage.

7. The method of claim 1, further comprising determining an output current signal of the one of the plurality of energy storage devices, and
wherein, the determining at least one control signal comprises determining the at least one control signal of the at least one switch based upon the output current signal.

8. An electrical power supply configured to supply a voltage to an electrical load, the power supply comprising:
a first energy storage device,
a switching power converter circuit having a first input configured to receive a control signal and a second input configured to receive a first storage voltage produced by the first energy storage device, the switching power converter circuit configured to produce the voltage supplied to the electrical load based on the first storage voltage and having a duty cycle defined by the control signal, and
a controller having a first input configured to receive the first storage voltage, a second input configured to receive an average voltage corresponding to an average of storage voltages produced by a number of other energy storage devices and the first storage voltage, and a third input configured to receive a reference voltage, the controller configured to produce the first control signal as a function of the first storage voltage, the average voltage, and the reference voltage.

9. The power supply of claim 8, wherein the first energy storage device comprises a number of ultracapacitors and each of the number of other energy storage devices comprises a number of ultracapacitors.

10. The power supply of claim 8, wherein the first energy storage device comprises a number of rechargeable batteries and each of the number of other energy storage devices comprises a number of rechargeable batteries.

11. The power supply of claim 8, wherein:
the controller has a fourth input configured to receive the output current from the first energy storage device, and
the controller is further configured to produce the first control signal as a function of the output current.

12. The power supply of claim 8, wherein the controller is configured to limit the average voltage between an upper limit and a lower limit, and
wherein the upper and lower limits are each based upon the first storage voltage.

13. The power supply of claim 8, wherein:
the a switching power converter circuit further includes at least one switch, and
the controller is further configured to produce the first control signal as a function of the power losses associated with the at least one switch.

14. The power supply of claim 8, wherein the switching power converter circuit is configured to conduct energy bidirectionally.

15. The power supply of claim 8, wherein the switching power converter circuit is configured to conduct energy unidirectionally.

16. The power supply of claim 8, wherein the average voltage comprises the voltage at an electrical node being electrically connected through separate resistive elements to an output terminal of the first energy storage device and an output terminal of each of the number of other energy storage devices.

17. The power supply of claim 8, wherein the reference voltage is an average voltage of a plurality of reference voltages.

18. The power supply of claim 8, wherein the switching power converter circuit is a boost converter circuit.

19. The power supply of claim 8, wherein the switching power converter circuit is a buck converter circuit.

20. The power supply of claim 8, wherein the switching power converter circuit is a push-pull converter circuit.

21. The power supply of claim 8, wherein the at least one switch is a MOSFET.

22. A power supply system comprising:
a plurality of power supplies each including a first and second output terminal, wherein:
the first output terminals of each of the plurality of power supplies are electrically connected to one another and the second output terminals of each of the plurality of power supplies are electrically connected to one another, and
each of the plurality of power supplies includes an energy storage device configured to produce a storage voltage, each energy storage device being electrically connected to a common electrical node through a separate resistive element, wherein the voltage at the electrical node is an average voltage of the storage voltages produced by each of the energy storage devices, and
each of the plurality of power supplies further includes:
a switching power converter circuit having a first input configured to receive a control signal and a second input configured to receive the storage voltage produced by the energy storage device, the switching power converter circuit configured to produce an output voltage across the first and second output terminals and having a duty cycle defined by the control signal, and
a controller having a first input configured to receive the storage voltage, a second input configured to receive the average voltage, and a third input configured to receive a reference voltage, the controller configured to produce the control signal based upon the storage voltage, the average voltage, and a reference voltage.

* * * * *